United States Patent
Tamura

(10) Patent No.: US 8,355,361 B2
(45) Date of Patent: Jan. 15, 2013

(54) CONTROL OF NETWORK RELAY DEVICE TO REDUCE STANDBY POWER CONSUMPTION

(75) Inventor: Nobuhiro Tamura, Nagoya (JP)

(73) Assignee: Buffalo Inc., Nagoya (JP)

( * ) Notice: Subject to any disclaimer, the term of this patent is extended or adjusted under 35 U.S.C. 154(b) by 253 days.

(21) Appl. No.: 12/764,012

(22) Filed: Apr. 20, 2010

(65) Prior Publication Data

US 2010/0272008 A1   Oct. 28, 2010

(30) Foreign Application Priority Data

Apr. 20, 2009   (JP) .................................. 2009-101937

(51) Int. Cl.
*H04B 7/185*   (2006.01)
(52) U.S. Cl. .......................... 370/318; 370/246; 370/401
(58) Field of Classification Search .................. 370/242, 370/243, 246, 401, 492, 501, 310–350
See application file for complete search history.

(56) References Cited

U.S. PATENT DOCUMENTS

| | | | | |
|---|---|---|---|---|
| 2005/0083832 | A1* | 4/2005 | Shimono | 370/216 |
| 2006/0133332 | A1* | 6/2006 | Achanta | 370/338 |
| 2006/0187905 | A1* | 8/2006 | Manabe | 370/352 |
| 2009/0213730 | A1* | 8/2009 | Zeng et al. | 370/217 |
| 2009/0240962 | A1* | 9/2009 | Keenly et al. | 713/310 |

FOREIGN PATENT DOCUMENTS

| | | |
|---|---|---|
| JP | 2000-156689 | 6/2000 |
| JP | 2001-358744 | 12/2001 |
| JP | 2002-300635 | 10/2002 |
| JP | 2004-56449 | 2/2004 |
| JP | 2005-305652 | 11/2005 |
| JP | 2006-157442 | 6/2006 |
| JP | 2007-104544 | 4/2007 |
| JP | 2008-252282 | 10/2008 |

OTHER PUBLICATIONS

Decision of Rejection dated Jun. 7, 2011 from Japanese Application No. 2009-101937.
Notification of Reason for Rejection dated Mar. 29, 2011 from Japanese Application No. 2009-101937.
Japanese Notification of Reason for Rejection dated Jan. 11, 2011 from Japanese Application No. 2009-101937.

* cited by examiner

*Primary Examiner* — Ricky Ngo
*Assistant Examiner* — Wei-Po Kao
(74) *Attorney, Agent, or Firm* — Beyer Law Group LLP

(57) ABSTRACT

The Ethernet converter includes a LAN switch, an RF device and an antenna, a wired device monitoring module, and an RF device controller. The RF device and the antenna carry out communication with wireless network devices. The wired device monitoring module monitors the operation state of the wired network devices via the LAN switch. The RF device controller controls the operation of the RF device on the basis of the operating state of the wired network devices. If the result of monitoring is that the wired network devices are not operating, the RF device controller stops the operation of the RF device so that power consumption by the RF device is less than when the wired network devices are operating.

5 Claims, 4 Drawing Sheets

CONTROL OF NETWORK RELAY DEVICE TO REDUCE STANDBY POWER CONSUMPTION

TECHNICAL FIELD

The present invention relates to a network relay device and to a method of controlling a network relay device.

RELATED ART

As the Internet has grown, there has been an associated expansion in number of various network devices connectable to networks such as LANs (Local Area Networks). Such network devices are available as wired network devices for wired connection to a network, and wireless network devices that connect wirelessly to a network.

In recent years, network relay devices that relay communications between wired network devices and wireless network devices have also become widespread. A network relay device has a wired communication unit for communication with wired network devices, and a wireless communication unit for communication with wireless network devices. One example of such a network relay device is an Ethernet™ converter.

With conventional network relay devices, during the time that the power is on, both the wired communication unit and the wireless communication unit are always running so that communications can be relayed at any time between wired network devices and wireless network devices. For this reason, consumption of standby power by such network relay devices was relatively high, so there exists a need to reduce standby power consumption.

An advantage of some aspects of the invention is to reduce the consumption of standby power in a network relay device to make the network relay device energy-efficient.

The entire disclosure of Japanese patent application No. 2009-101937, of Buffalo Inc. is hereby incorporated by reference into this document.

SUMMARY

The present invention is addressed to attaining the above objects at least in part according to the following modes of the invention.

According to a First Aspect of the invention, there is provided:

a network relay device adapted for wired connection to a first network device and wireless connection to a second network device to relay communications between the first network device and the second network device, comprising:

a wired communication unit configured to carry out communication with the first network device;

a wireless communication unit configured to carry out communication with the second network device;

a monitoring portion configured to monitor the first network device via the wired communication unit and decide whether the operating state of the first network device is a communication-enabled state or a communication-disabled state; and a control portion configured to control the operation of the wireless communication unit, wherein the control portion stops the operation of the wireless communication unit when the operating state of the first network device is the communication-disabled state.

According to the network relay device of the first aspect, when the operating state of the first network relay device is the communication-disabled state where there is no need to relay communications between the first network relay device and the second network relay device, the operation of the wireless communication unit is stopped. Accordingly, the power consumption of the wireless communication unit is less than when the operating state of the first network relay device is the communication-enabled state. Consequently, the consumption of standby power by the network relay device can be reduced to make the network relay device energy-efficient.

In the network relay device of the first aspect, examples of the mode in which the operation of the wireless communication unit is stopped include partially deactivating the wireless communication unit to place the unit in suspend mode, or interrupting the supply of power to the wireless communication unit.

According to a Second Aspect of the invention, there is provided:

a network relay device in accordance with the first aspect wherein, the control portion restarts the operation of the wireless communication unit when the monitoring portion decides that the operating state of the first network device is the communication-enabled state after the stopping of the operation of the wireless communication unit.

According to the network relay device of the second aspect, when the first network relay device resumes the communication-enabled state after the operation of the wireless communication unit has been stopped, the wireless communication unit can restart automatically without the need for a user operation to restart the wireless communication unit. The convenience of the network relay device is enhanced thereby.

According to a Third Aspect of the invention, there is provided:

a network relay device in accordance with the first aspect further comprising:

a malfunction monitoring portion configured to monitor the internal malfunction of the network relay device, wherein when an internal malfunction of the network relay device is detected by the malfunction monitoring portion after the stopping of the operation of the wireless communication unit, the control portion restarts the operation of the wireless communication unit, and the malfunction monitoring portion notifies, through the use of the wireless communication unit, the second network device that the malfunction was detected.

According to the network relay device of the third aspect, when an internal malfunction of the network relay device is detected after the operation of the wireless communication unit has been stopped, the wireless communication unit can start automatically and notify the second network relay device that a malfunction was detected. The convenience of the network relay device is enhanced thereby.

According to a Fourth Aspect of the invention, there is provided:

a network relay device in accordance with the first aspect wherein the network relay device is adapted for wired connections to a plurality of the first network devices, wherein at the startup of the network relay device, when the monitoring portion decides that the operating states of all of the plurality of the first network devices are the communication-disabled states, the control portion does not start up the operation of the wireless communication unit, but starts up the operation of one or more component of the network relay device other than the wireless communication unit.

According the network relay device of the fourth aspect, the consumption of standby power can be reduced from the time that the network relay device is started up, and the network relay device can be made energy-efficient.

According to a Fifth Aspect of the invention, there is provided:

a network relay device in accordance with the first aspect wherein in the event that the wired communication unit is receiving a link pulse signal from the first network device, the monitoring portion decides that the operating state of the first network device is the communication-enabled state; and in the event that the wired communication unit fails to receive a link pulse signal from the first network device, the monitoring portion decides that the operating state of the first network device is the communication-disabled state.

Typically, when the operating state of the first network relay device is the communication-enabled state, the first network relay device periodically transmits a link pulse signal. Consequently, the network relay device of the fifth aspect can easily monitor the operating state of the first network device to ascertain when the device is in the communication-enabled state.

In addition to embodiments as a network relay device, the present invention may also be embodied as a method of controlling a network relay device. Various other modes of implementation are possible, such as a computer program for accomplishing the functions of such a device or method; or a recording medium having the program recorded thereon. The various supplemental elements mentioned above may be implemented in these modes as well.

Where the present invention is embodied as a computer program or a recording medium having the program recorded thereon, it may constitute the entire program for controlling operations of the network relay device, or only that part for carrying out the functions of the present invention. Various computer-readable media may be employed as the recording medium, such as a flexible disk, CD-ROM, DVD-ROM, magneto-optical disk, IC card, ROM cartridge, punch card, printed matter imprinted with symbols such as a bar code, computer internal memory devices (memory such as RAM and ROM), and external memory devices.

These and other objects, features, aspects, and advantages of the present invention will become more apparent from the following detailed description of the embodiments of the invention along with the accompanying drawings.

DETAILED DESCRIPTION OF THE EMBODIMENTS

A. Features of Network System

Figure 1:
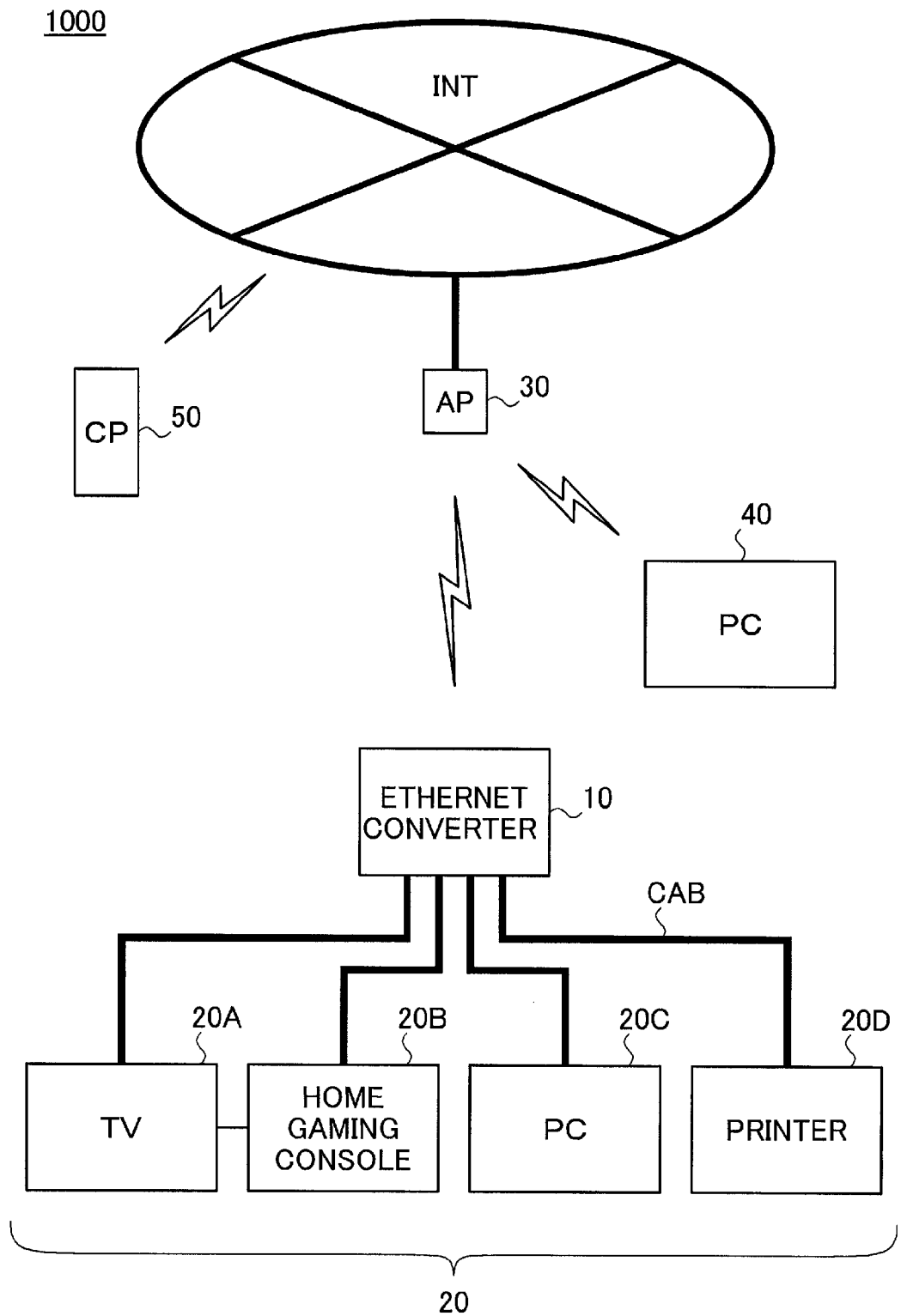
FIG. 1 depicts the general features of a network system 1000 in which the network relay device according to the present invention is an Ethernet converter 10.

FIG. 1 depicts the general features of a network system 1000 in which the network relay device according to the present invention is an Ethernet converter 10.

In the network system 1000 of the present embodiment, a network-connectable television receiver 20A, a home gaming console 20B, a personal computer (PC) 20C, and a printer 20D, each equipped with a wired communication unit such as a LAN port, are connected to the Ethernet converter 10 through LAN cables CAB. Hereafter, the television receiver 20A, the home gaming console 20B, the personal computer 20C, the printer 20D, and other like devices connectable to a network through LAN cables CAB, shown in FIG. 1 are collectively termed wired devices 20. An access point (AP) 30 having a wired connection to the Internet INT is connected wirelessly to the Ethernet converter 10 as well. The Ethernet converter 10 converts packets for wired transmission received from the wired devices 20 to packets for wireless transmission which are sent to the access point 30. The Ethernet converter 10 also converts packets for wireless transmission received from the access point 30 to packets for wired transmission which are sent to the wired devices 20. The wired devices 20 correspond to the "first network device" recited in the Summary. The access point 30 corresponds to the "second network device" recited in the Summary.

The network system 1000 of the present embodiment includes a personal computer 40 having a so-called wireless communication card installed to enable wireless communication with the access point 30. This personal computer 40 and the wired devices 20 are able to communicate via the access point 30 and the Ethernet converter 10. The network system 1000 additionally includes a cell phone (CP) 50 that is connectable to the Internet; this cell phone 50 and the wired devices 20 are able to communicate via the Internet, the access point 30, and the Ethernet converter 10.

By constructing the network system 1000 in this fashion, users are able to control the various wired devices 20 from the personal computer 40 or the cell phone 50, or to connect the wired devices 20 to the Internet for use.

B. Features of Ethernet Converter

Figure 2:
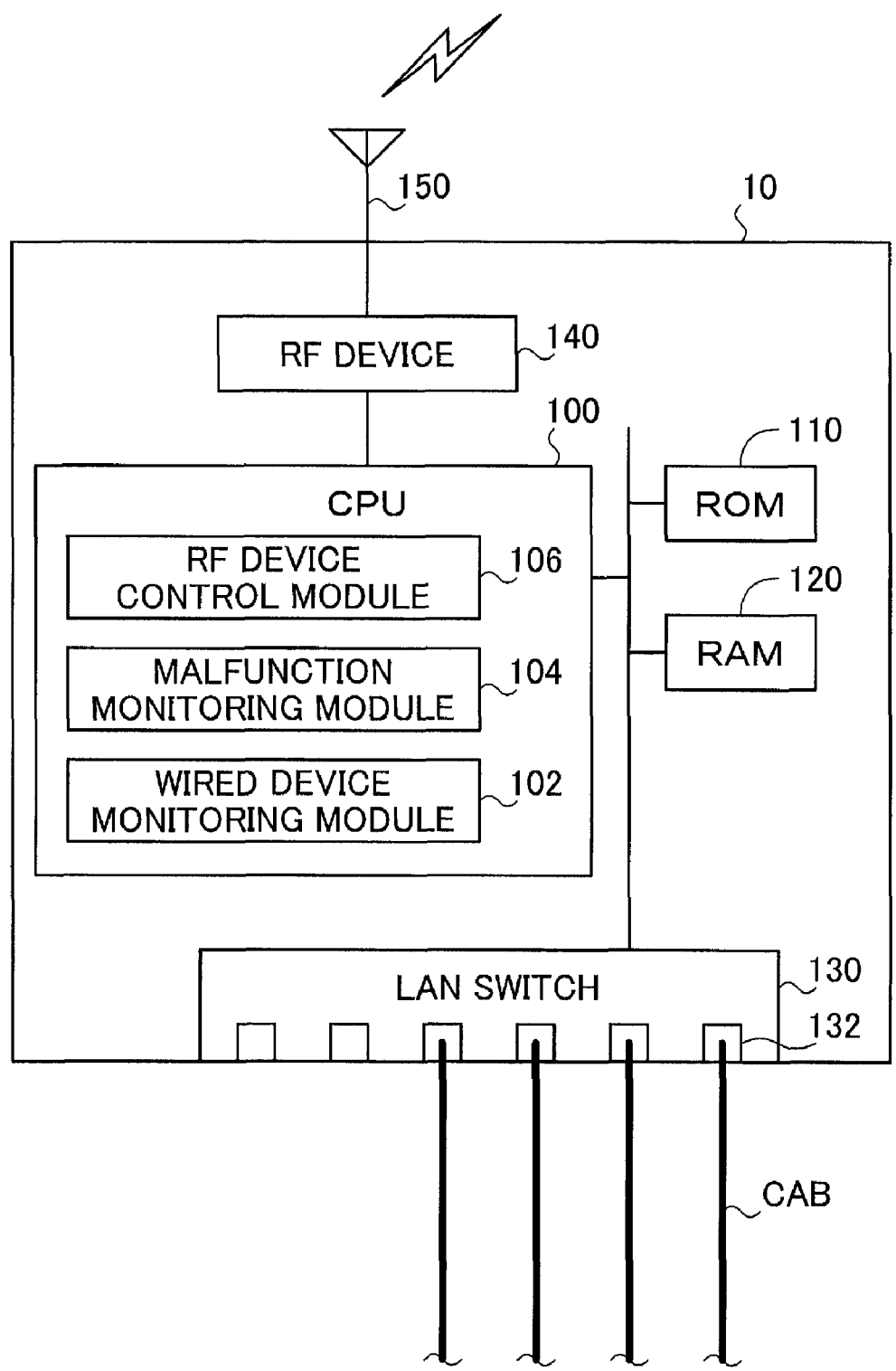
FIG. 2 schematically shows the configuration of the Ethernet converter 10.

FIG. 2 schematically shows the configuration of the Ethernet converter 10. As shown, the Ethernet converter 10 is furnished with a CPU 100, a ROM 110, a RAM 120, a LAN switch 130, an RF device 140, and an antenna 150.

The LAN switch 130 is equipped with a multiple LAN ports 132, to each of which is connected a LAN cable CAB. The LAN switch 130 carries out communication with the wired devices 20 via the LAN cables CAB. The LAN switch 130 corresponds to the wired communication unit recited in the Summary.

The RF device 140 and the antenna 150 carry out wireless communication with the access point 30. The RF device 140 is a device for sending and receiving wireless signals via the antenna 150. The RF device 140 and the antenna 150 correspond to the wireless communication unit recited in the Summary.

The CPU 100 controls the entire Ethernet converter 10. The CPU 100 has a wired device monitoring module 102, a malfunction monitoring module 104, and an RF device control module 106; and executes an RF device control process, discussed later. These function blocks are implemented as software functions, by reading out and executing computer programs that are stored in the ROM 110.

The wired device monitoring module 102 monitors the operating state of the wired devices 20 and decides whether they are in the communication-enabled state. In the present embodiment, in the case where the LAN switch 130 is receiving a link pulse signal from a wired device 20, the wired device monitoring module 102 decides that the operating state of the wired device 20 is the communication-enabled state. In the case where the LAN switch 130 is not receiving a link pulse signal from a wired device 20, the wired device monitoring module 102 decides that the operating state of the wired device 20 is the communication-disabled state. Typically, a wired device 20 in the communication-enabled state periodically transmits a link pulse signal, and thus by monitoring whether the LAN switch 130 is receiving a link pulse signal from a wired device 20, it can easily be decided whether the operating state of the wired device 20 is the communication-enabled state. The wired device monitoring module 102 corresponds to the monitoring portion recited in the Summary. Hereafter, the condition in which the LAN switch 130 is receiving a link pulse signal from a wired device 20 is also referred to as the condition in which the wired device 20 is "linked up". The condition in which the LAN switch 130 is not receiving a link pulse signal from a wired device 20 is also referred to as the condition in which the wired device 20 is "not linked up" or is "linked down".

The malfunction monitoring module 104 constantly monitors each component inside the Ethernet converter 10 for the occurrence of any malfunction. In the event that a malfunction has occurred in any part targeted for monitoring in the Ethernet converter 10, the malfunction monitoring module 104 notifies the personal computer 40, for example, via the access point 30 by wireless communication using the RF device 140.

On the basis of the operating state of the wired devices 20 as decided by the wired device monitoring module 102, or on the basis of the results of monitoring by the malfunction monitoring module 104, the RF device control module 106 controls starting and stopping of the operation of the RF device 140. The RF device control module 106 corresponds to the control portion recited in the Summary.

C. RF Device Control Process

Figure 3:
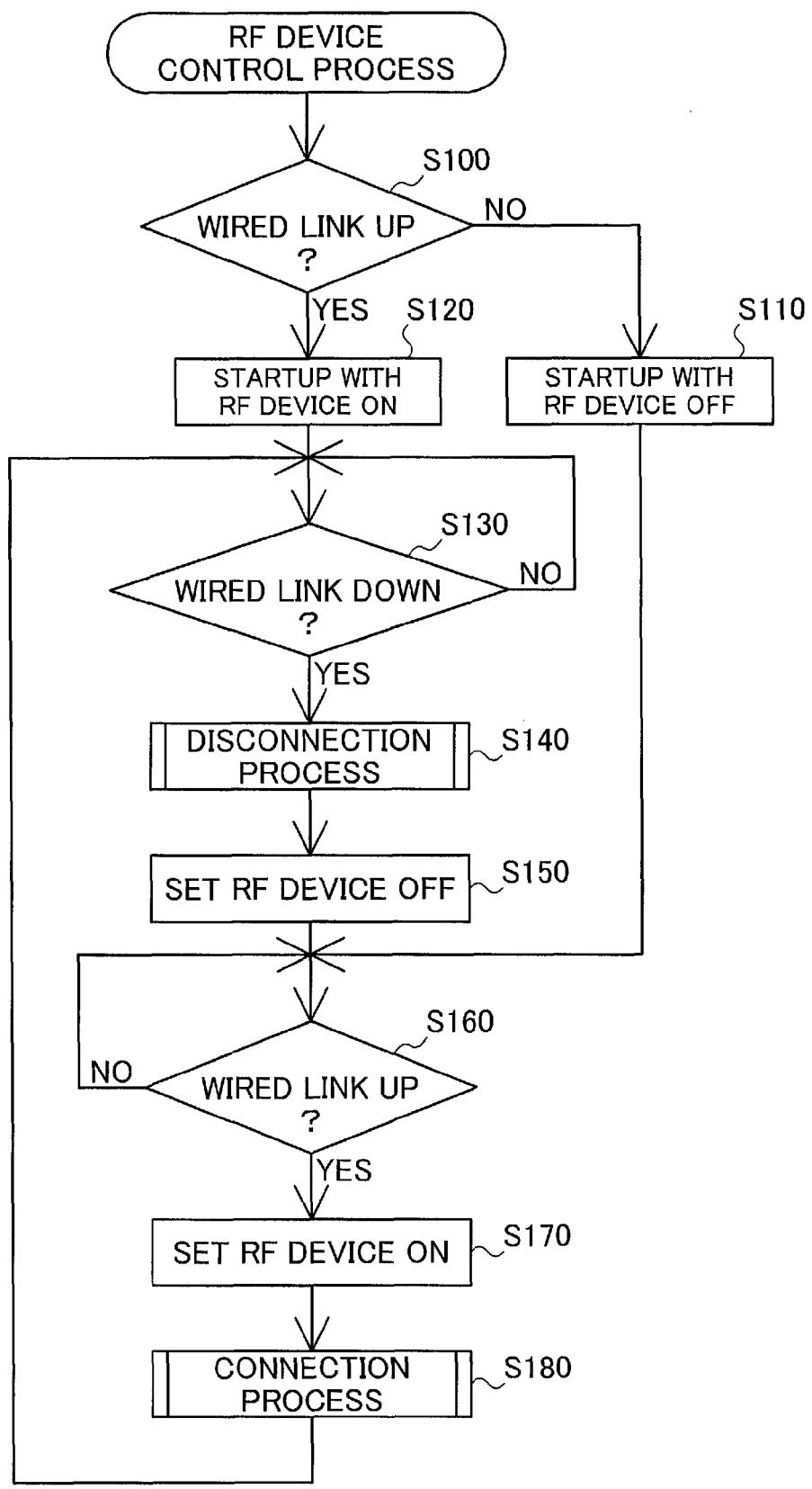
FIG. 3 is a flowchart of the process for controlling an RF device.

FIG. 3 is a flowchart of the process for controlling an RF device. This process is executed by the CPU 100 incorporated in the Ethernet converter 10.

First, when power to the Ethernet converter 10 is turned on, the CPU 100, through the wired device monitoring module 102, decides whether any wired devices 20 connected to the LAN switch 130 are linked up (Step S100). If none of the wired devices 20 are linked up (Step S100: NO), the CPU 100 leaves the operation of the RF device 140 OFF (Step S110) when starting up. By so doing, the consumption of standby power can be reduced from the time of startup of the Ethernet converter 10, making the Ethernet converter 10 energy-efficient.

In Step S100, if any of the wired devices 20 connected to the LAN switch 130 is linked up (Step S100: YES), the CPU 100 switches the operation of the RF device 140 to ON state (Step S120) when starting up.

After Step S120, the CPU 100, using the wired device monitoring module 102, monitors the link status (i.e. whether the device is linked up or linked down) of the wired devices 20 that are connected to the LAN switch 130, and decides whether all of the wired devices 20 are linked down (Step S130). If all of the wired devices 20 are not linked down, i.e. if any of wired devices 20 is linked up (Step S130: NO), the CPU 100 continues to monitor the link status of the wired devices 20 through the device monitoring module 102.

If on the other hand all of the wired devices 20 connected to the LAN switch 130 are linked down (Step S130: YES), the CPU 100, using the RF device control portion 106, executes a wireless communication disconnection process of the RF device 140 (Step S140) and turns OFF the operation of the RF device 140 (Step S150). In the present embodiment, the operation of the RF device 140 is turned OFF by placing the RF device 140 in suspend mode. Consumption of standby power by the Ethernet converter 10 can be reduced thereby, and the Ethernet converter 10 can be made energy-efficient.

After Step S150, the CPU 100, using the wired device monitoring module 102, monitors the link status of the wired devices 20 connected to the LAN switch 130, and decides if any of the wired devices 20 have been linked up (Step S160). If none of the wired devices 20 have been linked up (Step S160: NO), the CPU 100 continues to monitor the link status of the wired devices 20 through the device monitoring module 102.

If on the other hand any of the wired devices 20 connected to the LAN switch 130 has been linked up (Step S160: YES), the CPU 100 turns on the operation of the RF device 140 (Step S170) via the RF device control portion 106, and executes a wireless communication connection process that includes an authentication process etc. (Step S180). Because the RF device 140 can be started up automatically in this way without the need for a user operation to start up the RF device 140, the Ethernet converter 10 affords enhanced convenience.

After executing the connection process (Step S180), the routine returns to Step S130, and through the device monitoring module 102 the CPU 100 monitors the link status of the wired devices 20 connected to the LAN switch 130.

According to the Ethernet converter 10 of the present embodiment described above, when the wired devices 20 are not linked up, i.e. if the operating state of the wired devices 20 is the communication-disabled state, there is no need to relay communications between the wired devices 20 and the access point, and therefore the operation of the RF device 140 is interrupted. Consumption of standby power by the Ethernet converter 10 is reduced thereby, and the Ethernet converter 10 can be made energy-efficient.

In the Ethernet converter 10 of the present embodiment, the CPU 100 also executes the RF device control process described below as well as the RF device control process described above.

Figure 4:
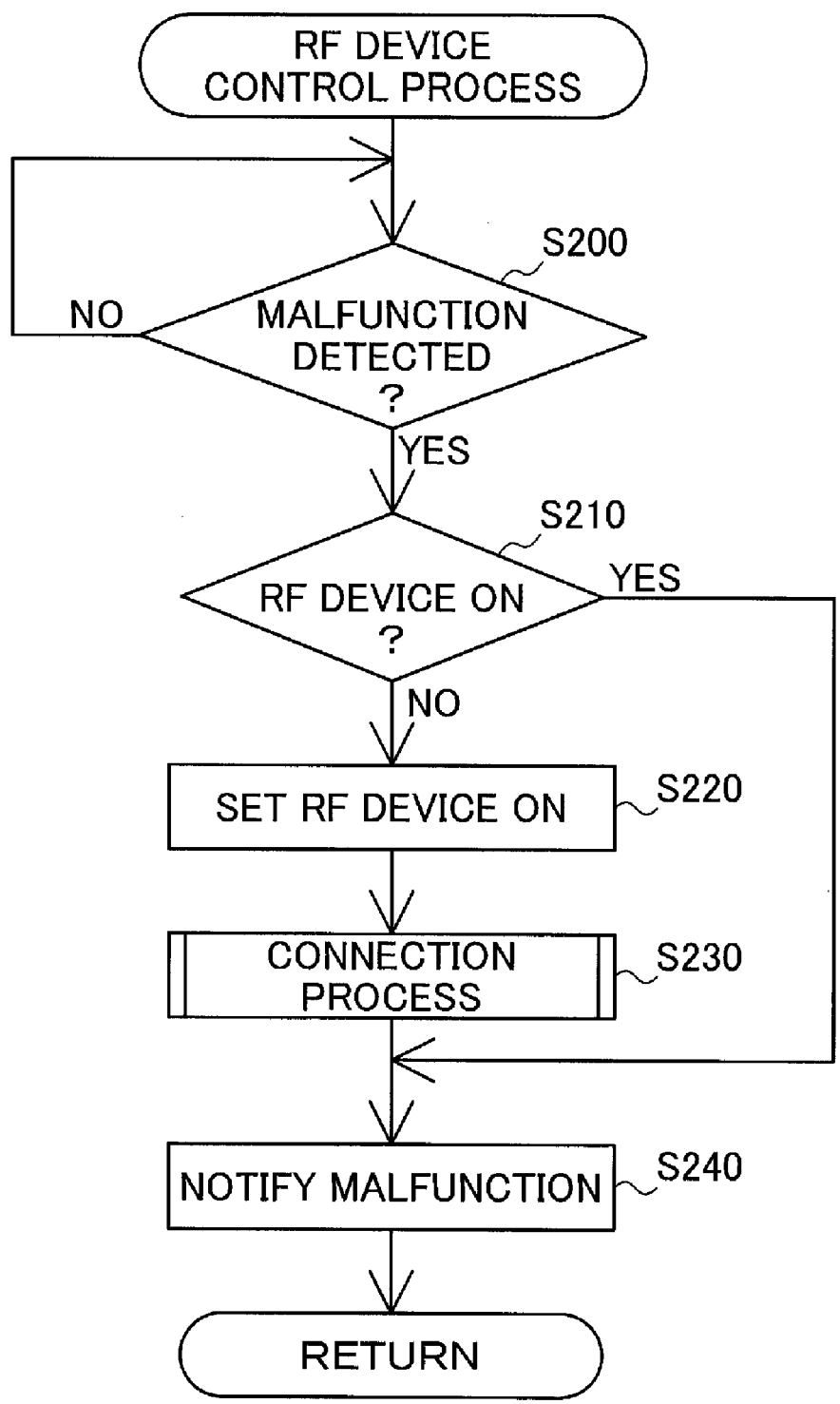
FIG. 4 is a flowchart of the process for controlling a second RF device.

FIG. 4 is a flowchart of a second RF device control process that is executed in parallel with the RF device control process shown in FIG. 3. This process is the processing which the CPU 100 executes consistently during the operation of the Ethernet converter 10. Here, the process flow will be described for an instance with the access point 30 and the personal computer 40 in the wireless communication-enabled state.

Through the malfunction monitoring module 104, the CPU 100 monitors each component in the Ethernet converter 10 for the occurrence of any malfunction, and decides whether a malfunction is detected in any of the parts being monitored (Step S200). If no malfunction is detected in any of the parts being monitored (Step S200: NO), the CPU 100, through the malfunction monitoring module 106, continues to monitor for malfunctions to occur in the components in the Ethernet converter 10

If on the other hand a malfunction was detected in any of the parts being monitored (Step S200: YES), the CPU 100 decides whether the operation of the RF device 140 is currently ON (Step S210). If the operation of the RF device 140 is currently on (Step S210: YES), the CPU notifies the personal computer 40 that a malfunction has been detected (Step S240), by wireless communication through the access point 30.

In Step S210, if operation of the RF device 140 is currently OFF (Step S210: NO), through the RF device control portion 106 the CPU 100 switches the operation of the RF device 140 to ON state (Step S220). The CPU 100 then executes a wireless communication connection process that includes an authentication process etc. (Step S230), and notifies the personal computer 40 that a malfunction has been detected (Step S240), by wireless communication through the access point 30.

Through this process the user can be notified that a malfunction has occurred in the Ethernet converter 10, so that enhanced convenience is provided for the Ethernet converter 10.

D. Modified Embodiments

While described heretofore by way of an embodiment, the present invention is not limited to such an embodiment and may be reduced to practice in various other modes without departing from the spirit thereof, such as the following modifications for example.

D1. Modified Embodiment 1

While the preceding embodiment describes an example of the network relay device of the present invention implemented in an Ethernet converter 10, the invention is not limited to the embodiment alone. The present invention is applicable generally to network relay devices that relay communications between wired network devices and wireless network devices, and may also be implemented in non-Ethernet network relay devices.

D2. Modified Embodiment 2

In the preceding embodiment, in the RF device control process of FIG. 3, during startup of the Ethernet converter 10, switching of the operation of the RF device 140 is carried out according to link status of the wired devices 20; however, the invention is not limited to such an arrangement. During the startup of the Ethernet converter 10, the operation of the RF device 140 may be switched ON or the operation of the RF device 140 may be switched OFF at startup irrespective of the link status of the wired devices 20.

For example, in the RF device control process of FIG. 3, Step S100 and Step S110 may be omitted. In this case, if all of the wired devices 20 connected to the LAN switch 130 are linked down despite the operation of the RF device 140 being switched to ON state (Step S120) at startup, the operation of the RF device 140 is turned OFF (Steps S130 to S150).

Alternatively, in the RF device control process of FIG. 3, Step S100 and Step S120 may be omitted. In this case, if any of the wired devices 20 connected to the LAN switch 130 is linked up despite the operation of the RF device 140 being switched to OFF state (Step S110) at startup, the operation of the RF device 140 is turned ON (Steps S160 to S180).

D3. Modified Embodiment 3

In the preceding embodiment, in Step S150 of the RF device control process depicted in FIG. 3, the operation of the RF device 140 is turned OFF by placing the RF device 140 in suspend mode, but the invention is not limited to such an arrangement. Alternatively, to switch OFF the operation of the RF device 140, the Ethernet converter 10 may be provided with a switch for ON/OFF switching of the power supply to the RF device 140, and the supply of power to the RF device 140 may be interrupted by setting the switch OFF.

D4. Modified Embodiment 4

In the preceding embodiment, the CPU 100 executes the second RF device control process of FIG. 4, but this process may be omitted.

D5. Modified Embodiment 5

In the preceding embodiment, the Ethernet converter 10 monitors whether the operating state of the wired devices 20 is the communication-enabled state, based on whether it is receiving link pulse signals sent from the wired devices 20, but the invention is not limited to such an arrangement. The operating state of the wired devices 20 may instead be monitored as to whether it is in the communication-enabled state based on some signal other than a link pulse signal, as long as the signal is sent from the wired device 20 when the operating state of the wired device 20 is the communication-enabled state.

D6. Modified Embodiment 6

The Program product may be realized as many aspects. For example:
(i) Computer readable medium such as the flexible disks, the optical disk, or the semiconductor memories;
(ii) Computer including the computer readable medium such as the magnetic disks or the semiconductor memories; and
(iii) Computer temporally storing the computer program in the memory through the data transferring means.

While the invention has been described with reference to embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A network relay device configured for wired connections to a plurality of first network devices and for wireless connection to a second network device to relay communications between the plurality of first network devices and the second network device with reduced standby power consumption, comprising:
a wired communication unit configured to carry out communication with the plurality of first network devices;
a wireless communication unit configured to carry out communication with the second network device;
a monitoring portion configured to monitor the plurality of first network devices via the wired communication unit and to decide whether an operating state of each of the plurality of first network devices is a communication-enabled state or a communication-disabled state not requiring the relaying of information; and
a control portion configured to control an operation of the wireless communication unit,
wherein the control portion stops the operation of the wireless communication unit when the operating state of all of the plurality of first network devices is the communication-disabled state and wherein at the startup of the network relay device, when the monitoring portion decides that the operating states of all of the plurality of first network devices are the communication-disabled states, the control portion does not start up the operation of the wireless communication unit, but starts up the operation of one or more components of the network relay device other than the wireless communication unit.

2. The network relay device in accordance with claim 1 wherein,
the control portion restarts the operation of the wireless communication unit when the monitoring portion decides that the operating state of at least one of the plurality of first network devices is the communication-enabled state after the stopping of the operation of the wireless communication unit.

3. The network relay device in accordance with claim 1 further comprising:
a malfunction monitoring portion configured to monitor the internal malfunction of the network relay device,
wherein when an internal malfunction of the network relay device is detected by the malfunction monitoring portion after the stopping of the operation of the wireless communication unit, the control portion restarts the operation of the wireless communication unit, and
the malfunction monitoring portion notifies the second network device, by the use of the wireless communication unit, that the malfunction has been detected.

4. The network relay device in accordance with claim 1 wherein
when the wired communication unit is receiving a link pulse signal from an individual first network device of the plurality of first network devices, the monitoring portion decides that the operating state of the individual first network device is the communication-enabled state; and
when the wired communication unit is not receiving a link pulse signal from the individual first network device, the monitoring portion decides that the operating state of the individual first network device is the communication-disabled state.

5. A method of controlling a network relay device configured for wired connections to a plurality of first network devices and for wireless connection to a second network device to relay communications between the plurality of first network devices and the second network device with reduced standby power consumption, the network relay device including:
a wired communication unit configured to carry out communication with the plurality of first network devices; and
a wireless communication unit configured to carry out communication with the second network device;
wherein the control method comprises the steps of:
monitoring the plurality of first network devices via the wired communication unit and deciding whether the operating state of each of the plurality of first network devices is a communication-enabled state or a communication-disabled state not requiring the relaying of information; and
controlling the operation of the wireless communication unit, wherein
the controlling of the operation of the wireless communication unit includes: 1) the operation at startup of the network relay device of not starting up the operation of the wireless communication unit when a decision is made that the operating state of all of the plurality of first network devices are the communication-disabled state, but starting up the operation of one or more components of the network relay device other than the wireless communication unit and 2) the operation of stopping the wireless communication unit when the operating state of all of the plurality of first network devices is the communication-disabled state.

\* \* \* \* \*